United States Patent [19]

Plichta et al.

[11] Patent Number: 5,114,432
[45] Date of Patent: May 19, 1992

[54] ELECTRODE FOR USE IN A HIGH TEMPERATURE RECHARGEABLE MOLTEN SALT BATTERY AND METHOD OF MAKING SAID ELECTRODE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 561,119

[22] Filed: Aug. 1, 1990

[51] Int. Cl.⁵ .............................. H01M 4/04
[52] U.S. Cl. ........................ 29/623.5; 427/123; 427/126.1; 427/126.3; 429/112
[58] Field of Search .......... 429/112, 209, 221; 29/623.5; 427/126.1, 126.3, 376.1, 376.2, 376.6, 123

[56] References Cited

U.S. PATENT DOCUMENTS

| | | | |
|---|---|---|---|
| 4,221,849 | 9/1980 | Harney | 429/218 X |
| 4,440,837 | 4/1984 | Shimotake et al. | 429/221 X |
| 4,447,376 | 5/1984 | Chobanov et al. | 429/112 X |
| 4,489,143 | 12/1984 | Gilbert et al. | 429/112 X |
| 4,952,467 | 8/1990 | Buchel et al. | 429/112 |

FOREIGN PATENT DOCUMENTS 2812608 10/1978 Fed. Rep. of Germany ...... 429/112

*Primary Examiner*—Stephen Kalafut
*Attorney, Agent, or Firm*—Michael Zelenka; Roy E. Gordon

[57] ABSTRACT

Cathode or anode electrodes are prepared for high temperature, rechargeable molten salt batteries using 80 to 90 weight percent of their respective active powdered components mixed with 10 to 20 weight percent powdered electrolyte salt. The powdered electrode mixture is then spread evenly onto an electrical current collector sheet or foil. The current collector containing the electrode mixture is then heated under a dry inert gas atmosphere to a temperature at or near the melting point of the electrolyte salt.

9 Claims, 1 Drawing Sheet

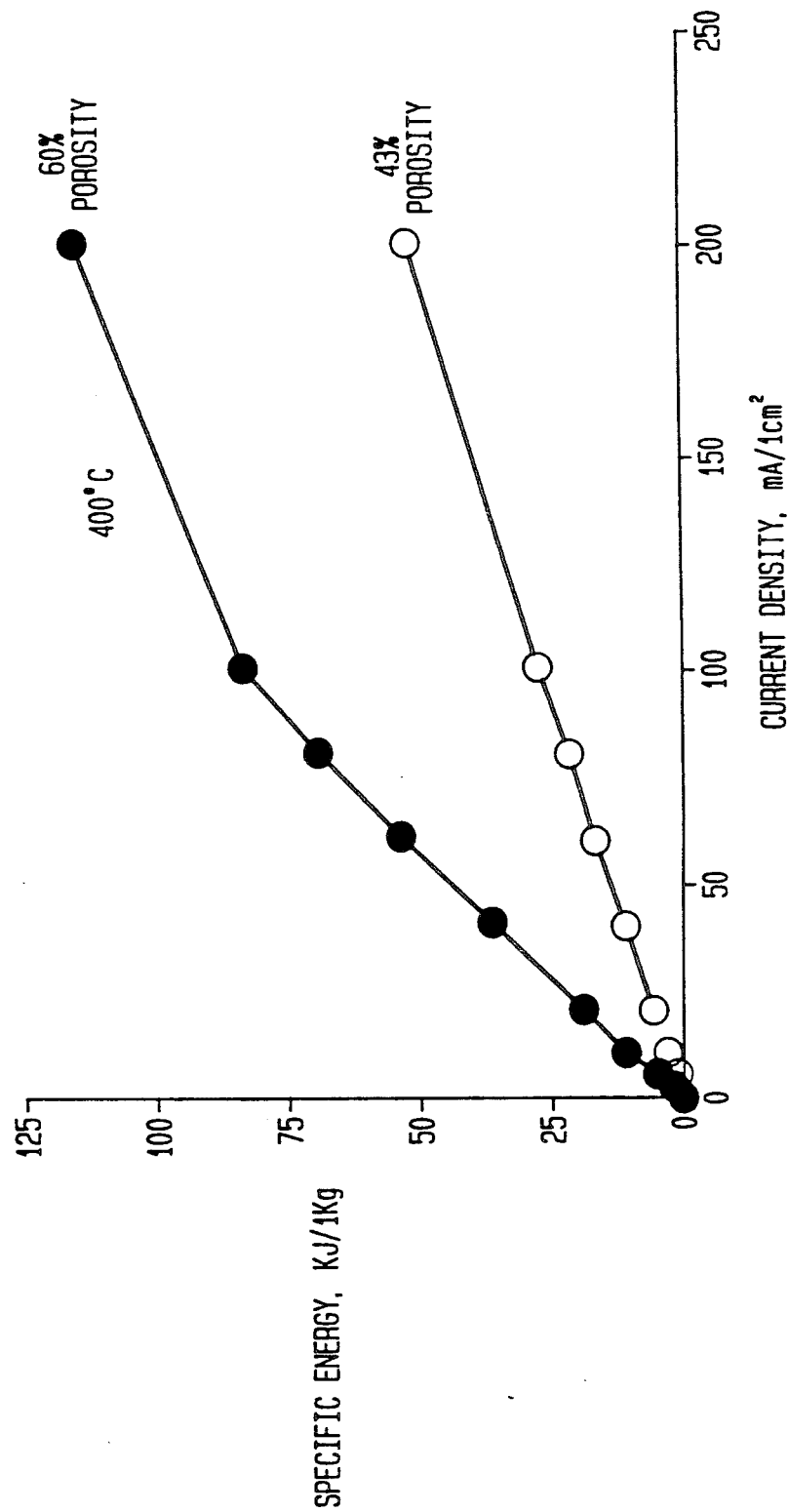

ELECTRODE FOR USE IN A HIGH TEMPERATURE RECHARGEABLE MOLTEN SALT BATTERY AND METHOD OF MAKING SAID ELECTRODE

GOVERNMENT INTEREST

The invention described herein may be manufactured, used, and licensed by or for the Government for governmental purposes without the payment to us of any royalty thereon.

FIELD OF INVENTION

This invention relates to a method of making high porosity, thin electrodes for use in high temperature rechargeable molten salt batteries and to the electrodes so prepared.

BACKGROUND THE INVENTION

Electrodes for use in high temperature, rechargeable molten salt batteries have been prepared by the pressed powder pellet technique. The difficulty with electrodes so made were that they had low porosities of 35 to 45 percent and could not be made much thinner than 0.1 cm thick as they became too fragile to handle.

SUMMARY OF THE INVENTION

The general object of this invention is to provide a method of preparing high porosity, thin electrodes for use in high temperature, rechargeable molten salt batteries. A more particular object of the invention is to provide a method of preparing such electrodes that are capable of delivering high current densities and specific energy densities over those electrodes produced by the pressed powder pellet technique. A still further object of the invention is to provide such a method of making the electrodes that is directly applicable for use in pulse power batteries where their high current operation necessitate the use of very thin electrodes having high porosities.

It has now been found that the aforementioned objects can be attained by preparing thermally sintered electrodes made from powdered mixtures of anodically or cathodically active materials and electrolyte salts onto an electrically conductive current collector.

More particularly, the cathode or anode electrodes are prepared using 80 to 90 weight percent of their respective active powdered components mixed with 10 to 20 weight percent powdered electrolyte salt. The powdered electrode mixture is then spread evenly using a doctor blade onto an electrical current collector sheet or foil. The current collector containing the electrode mixture is then heated under a dry inert gas atmosphere to a temperature at or near the melting point of the electrolyte salt. The cathode or anode active materials should have a melting point above that of the electrolyte. The heating duration is dependent upon the rate at which the electrolyte melts, which is typically of the order of 10 to 15 minutes.

In the invention, the anodically reactive material may be Li, Na, Al, Fe, Co, Ni, LiAl, and LiSi. The cathodically reactive material may be $LiCoO_2$, $LiNiO_2$, $LiFeO_2$, $V_2O_5$, $FeS_2$, $NiS_2$, $CoS_2$, $BaNiS_2$, FeS, NiS, and CoS. The electric current collector sheet is made of a material that is not attacked by chemical corrosion in the molten salt electrolyte. Such materials include graphite, stainless steel, molybdenum and tungsten.

DESCRIPTION OF THE PREFERRED EMBODIMENT

A specific electrode preparation for the cathode mixture of iron disulfide ($FeS_2$) and a eutectic electrolyte mixture of lithium chloride (LiCl) and potassium chloride (KCl) salts (51 mole percent LiCl and 49 mole percent KCl) is prepared onto a graphite disk current collector. The entire cathode preparation is performed in an argon filled dry box maintained at <2 ppm water that is equipped with a built-in muffle furnace. The preparation of these electrodes under inert gas conditions is required to avoid any decomposition reactions of the electrode materials with oxygen or moisture. The graphite current collector has a surface area of 1.27 $cm^2$ and is 0.4 cm in thickness. The cathode mixture is prepared as an intimately blended combination of 85 weight percent $FeS_2$ ($-325$ mesh) and 15 weight percent LiCl-KCl electrolyte ($-325$ mesh). A very thin layer of the cathode mixture is spread onto the graphite current collector by use of a doctor blade such that the weight of the cathode mixture is 0.084 gram over the 1.27 $cm^2$ surface area. The cathode is then placed in a muffle furnace for 10 minutes at 550° C. to allow for the electrolyte to sinter the powdered cathode material onto the graphite current collector. The sintered electrode is cooled to ambient temperature and found to have a cathode layer thickness of 0.06 cm and an apparent porosity of 60.0 percent. This same procedure is applicable for preparing the anode electrode and is suitable for use with metal current collectors and other molten salt battery electrolytes.

TABLE 1 shows the physical dimensions and porosities of the sintered electrolyte $FeS_2$ electrode versus a standard pressed powder pellet $FeS_2$ electrode. The pressed powder pellet preparation involves pressing a 0.3 gram cathode mixture of 85 weight percent $FeS_2$ and 15 weight percent LiCl-KCl electrolyte in a ½ inch diameter pellet die under 4000 pounds pressure. The pressed cathode pellets require high pressing pressures to sufficiently bond the powdered components and thereby avoid cracking. However, use of such high pressing pressures dramatically reduce the electrode porosity and limit the electrochemical performance of the electrode in a battery.

TABLE 1

| Iron Disulfide Electrode Comparison | | |
|---|---|---|
| Preparation Method | Pressed Powder Pellet | Sintered Electrolyte Electrode |
| Electrode Surface Area, $cm^2$ | 1.27 | 1.27 |
| Electrode Thickness, Cm | 0.09 | 0.06 |
| Electrode Porosity, percent | 43.1 | 60.0 |

DESCRIPTION OF THE DRAWING

FIG. 1 demonstrates the improved rate capabilities observed for the higher porosity sintered—electrolyte cathode versus the press powder pellet cathode in the LiAl/LiCl-KCl/$FeS_2$ cell at 400° C. In FIG. 1, the ordinate is Specific Energy, KJ/Kg and the abscissa is Current Density, mA/$cm^2$.

Referring to FIG. 1, it is seen that the specific energy density of the $FeS_2$ electrode is more than doubled at the higher current densities (>100 m A/$cm^2$) over the lower porosity pressed powder pellet electrode.

Use of the sintered electrolyte electrode method will enable the fabrication of cathode and anode electrodes for high temperature molten salt batteries that are thinner, have higher porosities, deliver higher specific energies, and are less fragile during handling than current electrodes prepared via the pressed powder pellet method.

We wish it to be understood that we do not desire to be limited to the exact details of construction shown and described for obvious modifications will occur to a person skilled in the art.

What is claimed is:

1. Method of making an electrode for use in a high temperature, rechargeable molten salt battery, said method including the steps of:

(A) mixing about 80 to 90 weight percent of a member of the group consisting of a reactive anode material and a reactive cathode material and about 10 to 20 weight percent of a powdered electrolyte salt, (B) spreading the powdered electrode mixture evenly onto an electric current collector sheet, and (C) heating the current collector containing the electrode mixture under a dry inert gas at or near the melting point of the electrolyte salt.

2. Method according to claim 1 wherein the heating is continued until the electrolyte has sintered the electrode mixture to the current collector.

3. Method according to claim 2 wherein the anodically reactive material is selected from the group consisting of Li, Na, Al, Fe, Co, Ni, LiAl, and LiSi.

4. Method according to claim 3 wherein the anodically reactive material is LiAl.

5. Method according to claim 2 wherein the cathodically reactive material is selected from the group consisting of $LiCoO_2$, $LiNiO_2$, $LiFeO_2$, $V_2O_5$, $FeS_2$, $NiS_2$, $CoS_2$, $BaNiS_2$, FeS, NiS, and CoS.

6. Method according to claim 5 wherein the cathodically reactive material is $FeS_2$.

7. Method according to claim 1 wherein the current collector sheet is made of a material not attacked by chemical corrosion in the molten salt electrolyte.

8. Method according to claim 7 wherein the current collector sheet material is selected from the group consisting of graphite, stainless steel, molybdenum, and tungsten.

9. Method according to claim 8 wherein the current collector sheet material is graphite.

* * * * *